July 1, 1924.

J. K. B. FALCK 1,499,765

SPEED CONTROLLING APPARATUS FOR AUTOMOBILES AND THE LIKE

Filed Aug. 2, 1922 2 Sheets-Sheet 2

Patented July 1, 1924.

UNITED STATES PATENT OFFICE.

JOHAN KRISTIAN BJARNE FALCK, OF LARVIK, NORWAY.

SPEED-CONTROLLING APPARATUS FOR AUTOMOBILES AND THE LIKE.

Application filed August 2, 1922. Serial No. 579,202.

*To all whom it may concern:*

Be it known that I, JOHAN KRISTIAN BJARNE FALCK, electrician, citizen of Norway, residing at Larvik, Norway, have invented certain new and useful Improvements in Speed-Controlling Apparatus for Automobiles and the like, of which the following is a specification.

My invention relates to a speed indicating apparatus for automobiles and the like of the kind in which a suitable device indicates the speed for which the apparatus is adjusted being connected with a governing device, which is operated from the wheel shaft and which will actuate audible visual signals when the allowed speed limit is being exceeded. The invention consists mainly in this, that the governing device is controlled by an adjustable spring, the adjustment of which is effected by means of the speed indicating device, whereby a plurality of speeds may be obtained, without employing different gearings between the wheel shaft and the shaft of the governor.

An embodiment of the invention is shown in the accompanying drawings, in which

Figure 1:
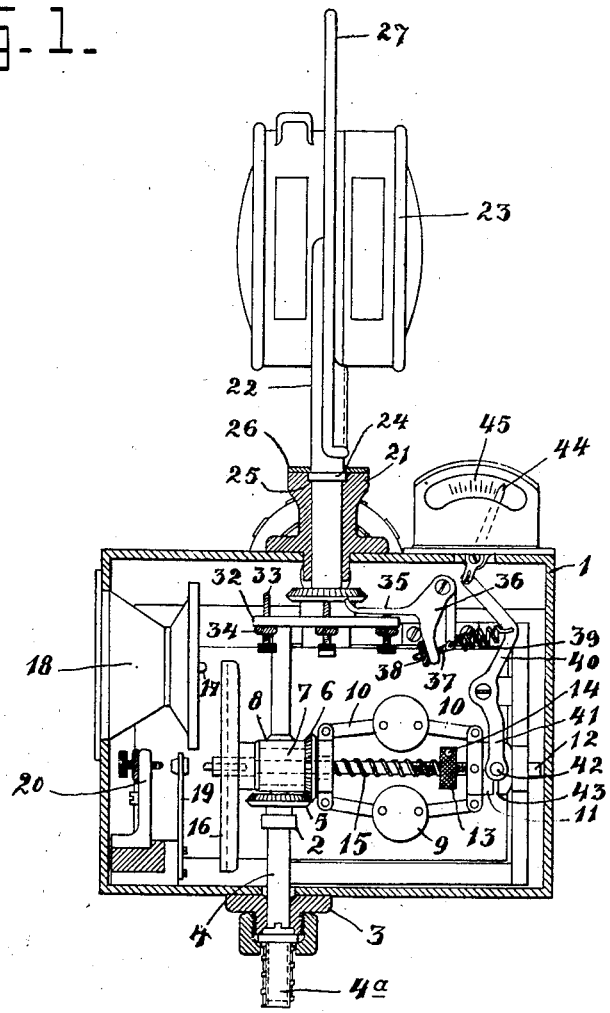
Figure 2:
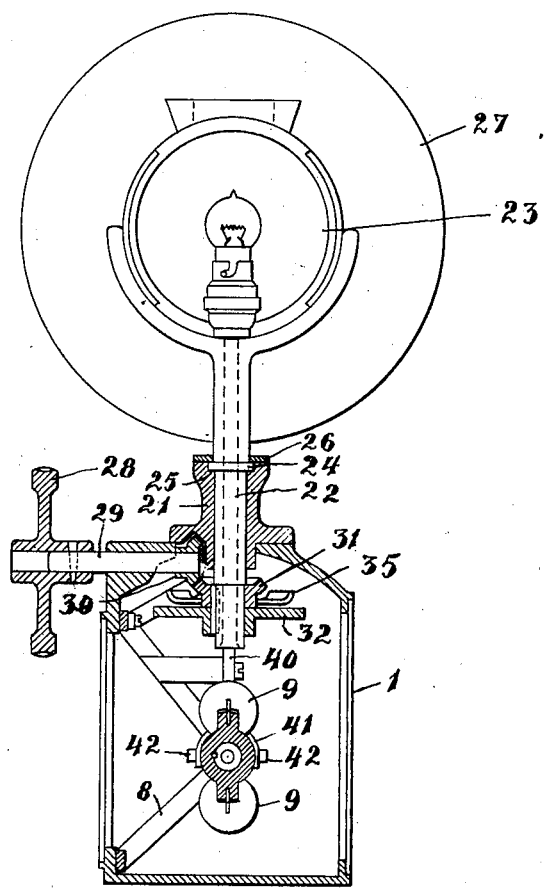

Figure 1 is a lateral view of the apparatus with a section through the casing and Figure 2 is a vertical section through the same apparatus.

In a casing 1 a shaft 4 is journalled by means of a bearing 2 and a sleeve 3. The said shaft is in a suitable manner connected to a shaft 4ª, which by means of any well-known gearing is operated from the wheel axle. At the upper end of the shaft 4 a toothed bevel wheel 5 is located which meshes with a similar wheel 6, fast on a sleeve 7. The latter is rotatably arranged in a bracket 8 on the wall of the casing and is connected to a ball governor 9, the balls of which are connected to a sleeve 11 by means of the links 10. The sleeve 11 is loosely arranged upon a spindle 12, which is displaceably but not rotatably situated in a central bore in the sleeve 7. Upon the spindle 12 a nut 13 is screwed, the position of which may be secured by means of a set-screw 14. The nut serves as an abutment for a helical spring 15, which presses the spindle 12 to the right. Upon the other end of the spindle 12 a disc 16 is fastened, which preferably is formed with a rugged edge for the operation of the pin 17 of a siren 18 located in the wall of the casing 1. 19 denotes a contact spring which by the spindle 12 will be pressed against the contact 20, thereby closing an electric circuit. In the upper end of the casing 1 a bearing sleeve 21 is provided in which a shaft 22 is journalled, which carries a lantern 23. The shaft 22 is formed with a flange 24, which is adapted to fit into a corresponding seat 25 in the sleeve 21 and is kept in its place by means of a cover plate 26. The lantern 23 may suitably be equipped with glasses of different colours at the front, at the back and at the sides in order to indicate the different grades of speed at night. Further the lantern is formed with a flange 27, which is painted with the same colours in order to indicate the different grades of speed at day-time. The different angular positions of the lantern are set by means of a hand wheel 28, (Fig. 2.) which by means of the shaft 29 and a toothed bevel wheel 30 operates a toothed bevel wheel 31 fast on the shaft 22. At the end of the shaft 22 a disc 32 is fastened, in which a plurality of screws 33 are arranged, which may be secured in their different positions by means of counter nuts 34. These screws serve as abutments for a fork-shaped arm 35, which by means of a pin is pivoted to the wall of the casing. To facilitate the conducting of the different screws 33 under the fork 35, the end of the fork is bent upward, so that any screw easily will slide under the fork and come into correct engagement with the same. From the fork 35 an arm 36 projects downward, to which one end of a spring 39 is fastened by means of a screw 37 and an adjustment nut 38. The other end of the spring is connected to a lever 40, pivoted to the wall of the casing 1. The lower end of the lever is formed as a fork 41, which engages the sleeve 11 on the spindle 12 forcing it to the right by means of pins 42, which engage a peripherical groove 43 formed in the sleeve.

The other end of the lever 40 is connected to a pointer 44 which plays over a dial 45 indicating the speed for which the apparatus is set.

The apparatus operates in the following manner:

Assuming that the lantern 23 and the disc 32 have been adjusted for town-speed, the shaft 4 through the agency of the toothed wheels 5 and 6 will rotate the sleeve 7 and the governor 9, so that the centrifugal movement of the governor balls will overcome the pull of the spring 39 upon the lever 40 and move the sleeve 11, the nuts 13 and the spindle 12 to the left. The disc 16 will engage the membrane pin 17 and operate the siren 18. Simultaneously the end of the spindle 12 will close the contacts 19, 20 and operate a signal bell (not shown) or open the ignition circuit of the motor, so that the same is stopped.

If it is desired to set the apparatus for country-speed the lantern is turned by means of the hand wheel 28 say 180° so that the longest screw 33 on the disc 32 is pressed under the arm 35, whereby the spring 39 is put under tension. In order to overcome the tension of the spring 39 the governor 9 now must make a number of revolutions corresponding to the difference in speed, whereby the indicating means are operated as described above.

It will be understood that the apparatus can not be rendered inoperable by placing the lantern in an intermediate position, because in such case the arm 35 will come to rest against the disc 32, so that only the lowest speed is obtained.

As a further means of securing a correct employment of the apparatus a contact device may be formed on the periphery of the disc 32, so that the ignition circuit is kept open as long as the lantern is not placed in its correct position.

I claim as my invention:

1. In a speed indicating apparatus for motor-driven vehicles, the combination with a closed casing, of a shaft rotatably journalled therein and adapted to be rotated from the wheel-axle of the vehicle, a ball-governor operated by the said shaft, an axially movable spindle adapted to be displaced by the said governor in the direction of its axis, means carried by the said spindle for operating a signalling device on a predetermined speed of the governor being exceeded, an adjustable speed controlling spring connected with the said governor, a second shaft, rotatably journalled in the said casing, a lantern having variously colored glasses being carried by the said shaft, manually operated means for turning the said second shaft thereby changing the angular position of the said lantern to indicate a certain speed, a disk carried by the said second shaft within the said casing, adjustable abutments located on said disk, a spring controlled pivoted arm adapted to co-operate with the said abutments, and connecting means between the said arm and the said ball-governor.

2. In a speed indicating apparatus for motor-driven vehicles, the combination with a closed casing, of a shaft rotatably journalled therein and adapted to be rotated from the wheel-axle of the vehicle, a ball-governor operated by the said shaft, an axially movable spindle adapted to be displaced by the said governor in the direction of its axis, means carried by the said spindle for operating a signalling device on a predetermined speed of the governor being exceeded, an adjustable speed controlling spring connected with the said governor, a second shaft, rotatably journalled in the said casing, a lantern having variously colored glasses being carried by the said shaft, manually operated means for turning the said second shaft thereby changing the angular position of the said lantern to indicate a certain speed, a disk carried by the said second shaft within the said casing, abutments adjustably mounted on the said disk, a pivoted bell-crank having one arm extending into the path of the said abutments and adapted to cooperate therewith, a two-arm lever pivoted to said casing and connected to the said ball-governor, and an adjustable spring connecting the said two-arm lever with the other arm of the said bell-crank, the tension of the said spring determining the speed to be exceeded.

3. In a speed indicating apparatus for motor-driven vehicles, the combination with a closed casing, of a shaft rotatably journalled therein and adapted to be rotated from the wheel-axle of the vehicle, a ball-governor operated by the said shaft, an axially movable spindle adapted to be displaced by the said governor in the direction of its axis, means carried by the said spindle for operating a signalling device on a predetermined speed of the governor being exceeded, an adjustable speed controlling spring connected with the said governor, a second shaft, rotatably journalled in the said casing, a lantern having variously colored glasses being carried by the said shaft, manually operated means for turning the said second shaft thereby changing the angular position of the said lantern to indicate a certain speed, a disk carried by the said second shaft within the said casing, adjustments adjustably mounted on the said disk, a pivoted bell-crank having one arm extending into the path of the said abutments and adapted to cooperate therewith, a two-arm lever pivoted to said casing and connected to the said ball-governor, and an adjustable spring connecting the said two-arm lever with the other arm of the said bell-crank, the tension of the said spring determining the speed to be exceeded, the arm of the said bell-crank extending into the path of the said abutments said arm being upwardly curved.

In testimony whereof I affix my signature in presence of two witnesses.

JOHAN KRISTIAN BJARNE FALCK.

Witnesses:
AXEL LAHN,
EYVIND NORDBY.